United States Patent
Hu

(10) Patent No.: US 10,136,304 B2
(45) Date of Patent: Nov. 20, 2018

(54) METHOD, DEVICE AND TERMINAL FOR MOBILE TERMINALS TO EXCHANGE USER INFORMATION

(71) Applicant: ZTE CORPORATION, Shenzhen, Guangdong Province (CN)

(72) Inventor: Bo Hu, Shenzhen (CN)

(73) Assignee: XI'AN ZHONGXING NEW SOFTWARE CO., LTD., Xi'An, Shaanxi (CN)

(*) Notice: Subject to any disclaimer, the term of this patent is extended or adjusted under 35 U.S.C. 154(b) by 277 days.

(21) Appl. No.: 14/781,037

(22) PCT Filed: Jul. 15, 2013

(86) PCT No.: PCT/CN2013/079418
§ 371 (c)(1),
(2) Date: Sep. 29, 2015

(87) PCT Pub. No.: WO2013/182135
PCT Pub. Date: Dec. 12, 2013

(65) Prior Publication Data
US 2016/0057608 A1    Feb. 25, 2016

(30) Foreign Application Priority Data
Mar. 29, 2013 (CN) .......................... 2013 1 0106737

(51) Int. Cl.
*H04W 8/18* (2009.01)
*H04W 4/80* (2018.01)
(Continued)

(52) U.S. Cl.
CPC .............. *H04W 8/18* (2013.01); *H04W 4/80* (2018.02); *H04W 48/16* (2013.01);
(Continued)

(58) Field of Classification Search
CPC .. H04L 67/1095; H04L 67/306; H04W 48/16; H04W 48/20; H04W 4/008; H04W 4/02; H04W 84/12; H04W 8/18
See application file for complete search history.

(56) References Cited

U.S. PATENT DOCUMENTS

2007/0171910 A1    7/2007 Kumar
2007/0220268 A1*   9/2007 Krishnaprasad .. G06F 17/30427
                                                    713/182
(Continued)

FOREIGN PATENT DOCUMENTS

CN    102724668 A    10/2012
CN    102932958 A    2/2013
(Continued)

OTHER PUBLICATIONS

XP031165179; Beacon-Stuffing; Wi-Fi Without Associations; Eighth IEEE Workshop on Mobile Computing Systems and Applications; Ranveer Chandra et al. 2007.
(Continued)

*Primary Examiner* — Ayaz Sheikh
*Assistant Examiner* — Debebe Asefa
(74) *Attorney, Agent, or Firm* — Ling Wu; Stephen Yang; Ling and Yang Intellectual Property

(57) ABSTRACT

Disclosed are a method and a device for a mobile terminal to change user information, and a terminal, comprising that: a second mobile terminal obtains a wireless fidelity (wifi) hotspot shared name of a first mobile terminal by wifi searching; the second mobile terminal resolves the wifi hotspot shared name of the first mobile terminal to obtain the user information of the first mobile terminal, and the user information of the first mobile terminal is saved. In the embodiments of the present document, the operation of adding contact information is performed according to the wifi hotspot name by opening the wifi hotspot, which saves the step of the user inputting information, brings convenience to the user and saves the time.

11 Claims, 2 Drawing Sheets

(51) Int. Cl.
    *H04W 48/16*     (2009.01)
    *H04W 48/20*     (2009.01)
    *H04W 84/12*     (2009.01)
    *H04L 29/08*     (2006.01)
    *H04W 4/02*     (2018.01)

(52) U.S. Cl.
    CPC ........ *H04L 67/1095* (2013.01); *H04L 67/306* (2013.01); *H04W 4/02* (2013.01); *H04W 48/20* (2013.01); *H04W 84/12* (2013.01)

(56) References Cited

U.S. PATENT DOCUMENTS

2010/0274867 A1   10/2010   Sawada
2013/0007853 A1*   1/2013   Gupta .................. H04W 76/10
                                      726/5

FOREIGN PATENT DOCUMENTS

| | | |
|---|---|---|
| CN | 103209498 A | 7/2013 |
| JP | 2009194747 A | 8/2009 |
| JP | 2012044638 A | 3/2012 |
| WO | WO2011041905 A | 4/2011 |

OTHER PUBLICATIONS

XP55212820; Show me your SSID's, I'll Tell Who You Are! Apr. 3, 2012.
XP055249512; Bit-Stuffing in 802.11 Beacon Frame: Embedding Non-Standard Custom Information; International Journal of Computer Applications (0975-8887); vol. 63—No. 2, Feb. 2013.

* cited by examiner

METHOD, DEVICE AND TERMINAL FOR MOBILE TERMINALS TO EXCHANGE USER INFORMATION

TECHNICAL FIELD

The present document relates to the wireless communication field, and in particular, to a method and a device for a mobile terminal to exchange user information.

BACKGROUND OF THE RELATED ART

When the contacts are added in the related terminal operating system, they are input manually with a low speed and input errors easily occur. When there are many persons gathering together and when the persons need to add the contact information for each other, they can just press a button to start wifi, and open a hotspot. Then a scan request is initiated, and according to a wifi hotspot shared name, the name and contact information for each other are added into their own cellphones, which greatly facilitate adding contacts for the people, and save a lot of operations such as input.

SUMMARY

The object of the embodiment of the present document is to provide a method and a device for a mobile terminal to exchange user information, and a terminal, wherein contact information is added according to a name of a wifi hotspot by starting the wifi hotspot.

According to one aspect of the embodiment of the present document, a method for a mobile terminal to exchange user information is provided, and the method comprises the following steps:

a second mobile terminal obtaining a wireless fidelity (wifi) hotspot shared name of a first mobile terminal by wifi searching;

the second mobile terminal resolving the wifi hotspot shared name of the first mobile terminal to obtain user information of the first mobile terminal;

saving the user information of the first mobile terminal;

Preferably, the step of the second mobile terminal resolving the wifi hotspot shared name of the first mobile terminal to obtain user information of the first mobile terminal comprises:

the second mobile terminal resolving the wifi hotspot shared name of the first mobile terminal to judge whether the resolved wifi hotspot shared name is a wifi hotspot shared name conforming to a preset canonical format;

if the resolved wifi hotspot shared name is the wifi hotspot shared name conforming to the preset canonical format, obtaining the user information of the first mobile terminal from the wifi hotspot shared name.

Preferably, the step of saving the user information of the first mobile terminal comprises:

the second mobile terminal comparing the obtained user information of the first mobile terminal with all user information in the second mobile terminal;

if there is no user information of the first mobile terminal in the second mobile terminal, saving the user information of the first mobile terminal into user information of the second mobile terminal.

According to one aspect of the embodiment of the present document, a method for a mobile terminal to exchange user information is provided, comprising: a first mobile terminal used to transmit information setting the user information into a wireless fidelity (wifi) hotspot shared name of the first mobile terminal and opening a wifi hotspot shared function of the first mobile terminal.

Preferably, the step of a first mobile terminal used to transmit information setting user information of the first mobile terminal into a wifi hotspot shared name of the first mobile terminal comprises:

the first mobile terminal used to transmit information saving a previous wifi hotspot shared name of the first mobile terminal, and setting the user information according to a preset canonical format into the wifi hotspot shared name of the first mobile terminal;

wherein, the preset canonical format is: a special character+a user name+a special character+a mobile terminal number.

According to another aspect of the embodiment of the present document, a device for a mobile terminal to exchange user information is provided, comprising:

a mobile terminal searching module, configured to obtain a wireless fidelity (wifi) hotspot shared name of a first mobile terminal by a second mobile terminal which obtains user information of the first mobile terminal through wifi searching;

a mobile terminal resolving module, configured to obtain user information of the first mobile terminal by the second mobile terminal resolving the wifi hotspot shared name of the first mobile terminal;

a mobile terminal storing module, configured to save the user information of the first mobile terminal.

Preferably, the mobile terminal resolving module comprises:

a judging unit, configured to judge whether the resolved wifi hotspot shared name is a wifi hotspot shared name conforming to a preset canonical format by the second mobile terminal resolving the wifi hotspot shared name of the first mobile terminal;

an obtaining unit, configured to, when the resolved wifi hotspot shared name is the wifi hotspot shared name conforming to the preset canonical format, obtain the user information of the first mobile terminal from the wifi hotspot shared name.

Preferably, the mobile terminal storing module comprises:

a comparing unit, configured to compare the obtained user information of the first mobile terminal with all user information in a local mobile terminal;

a storing unit, configured to, when there is no user information of the first mobile terminal in the local mobile terminal, save the user information of the first mobile terminal into user information of the local mobile terminal.

According to another aspect of the embodiment of the present document, a mobile terminal including the above-mentioned device for a mobile terminal to exchange user information is provided.

According to another aspect of the embodiment of the present document, a device for a mobile terminal to exchange user information is provided, comprising:

a storing unit, configured to store a previous wireless fidelity (wifi) hotspot shared name of a local mobile terminal;

a setting unit, configured to set user information of the local mobile terminal according to a preset canonical format into the wifi hotspot shared name of the local mobile terminal; wherein, the preset canonical format is: a special character+a user name+a special character+a mobile terminal number; and a control unit, configured to open a wifi hotspot sharing function of the local mobile terminal.

According to another aspect of the embodiment of the present document, a mobile terminal including the above-mentioned device for a mobile terminal to exchange user information is provided.

Compared with the related art, the beneficial effects of the present document lie in that:

In the embodiments of the present document, the operation of adding contact information is performed according to the wifi hotspot name by opening the wifi hotspot, which saves the step of the user inputting information, brings convenience to the user and saves the time.

PREFERRED EMBODIMENTS OF THE INVENTION

The preferred embodiments of the present document are described in detail with reference to the accompanying drawings hereinafter. It should be understood that, the embodiments illustrated hereinafter are used to describe and explain the embodiments of the present document, rather than limiting the embodiments of the present document.

Figure 1:
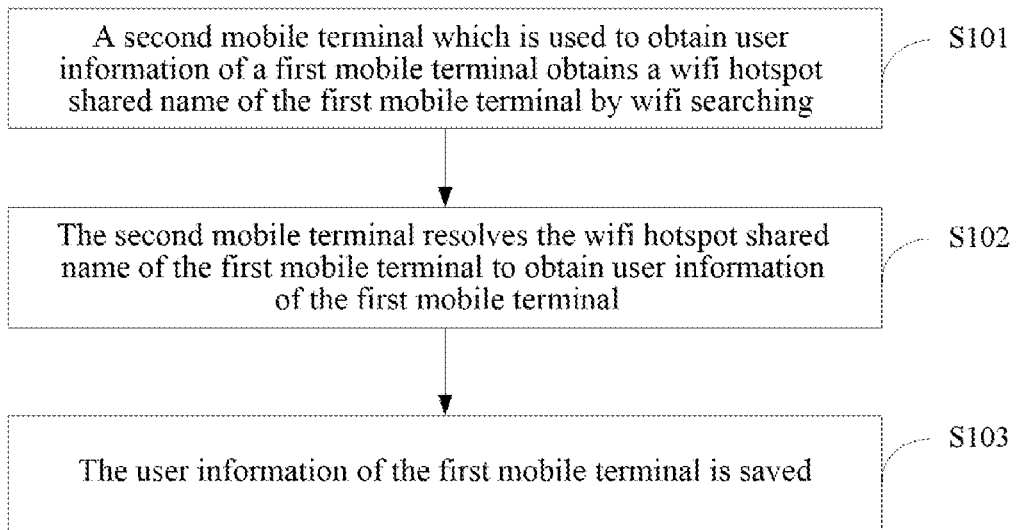
FIG. 1 is a flow chart of a method for a mobile terminal to exchange user information provided in the embodiment of the present document.

FIG. 1 shows a flow chart of a method for a mobile terminal to exchange user information provided in the embodiment of the present document, as shown in FIG. 1, which comprises the following steps.

In step S101, a second mobile terminal used to obtain user information of a first mobile terminal obtains a wifi hotspot shared name of the first mobile terminal by wifi searching;

In step S102, the second mobile terminal resolves the wifi hotspot shared name of the first mobile terminal to obtain user information of the first mobile terminal;

In step S103, the user information of the first mobile terminal is saved.

The embodiment of the present document further comprises: a first mobile terminal used to transmit information setting user information of the first mobile terminal into a wifi hotspot shared name of the first mobile terminal and opening a wifi hotspot sharing function of the first mobile terminal.

In the embodiment of the present document, the step of a first mobile terminal used to transmit information setting user information of the first mobile terminal into a wifi hotspot shared name of the first mobile terminal comprises: the first mobile terminal used to transmit information saving a previous wifi hotspot shared name of the first mobile terminal, and setting the user information according to a preset canonical format into the wifi hotspot shared name of the first mobile terminal; wherein, the preset canonical format is: a special character+a user name+a special character+a mobile terminal number.

In the embodiment of the present document, the step of the second mobile terminal resolving the wifi hotspot shared name of the first mobile terminal to obtain user information of the first mobile terminal comprises: the second mobile terminal resolving the wifi hotspot shared name of the first mobile terminal to judge whether the resolved wifi hotspot shared name is a wifi hotspot shared name conforming to a preset canonical format; if the resolved wifi hotspot shared name is the wifi hotspot shared name conforming to the preset canonical format, obtaining the user information of the first mobile terminal from the wifi hotspot shared name.

Wherein the step of saving the user information of the first mobile terminal comprises: the second mobile terminal comparing the obtained user information of the first mobile terminal with all user information in the second mobile terminal; if there is no user information of the first mobile terminal in the second mobile terminal, saving the user information of the first mobile terminal into user information of the second mobile terminal, or if there is a user name of the user information of the first mobile terminal in the user information of the second mobile terminal, comparing whether the mobile terminal number of the user information exists, if it does not exist, saving the mobile terminal number of the user information of the first mobile terminal into the user information of the second user information, or reminding the user to add the user information of the first mobile terminal again and saving it.

Wherein, the first mobile terminal and the second mobile terminal are mobile terminals with a function of an access point (AP).

Figure 2:
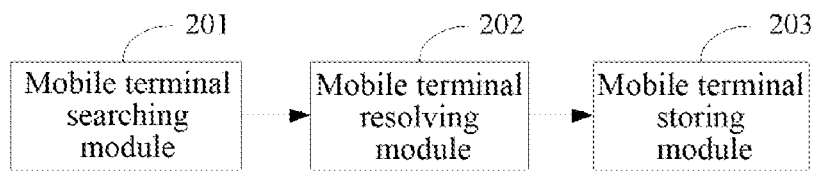
FIG. 2 is a schematic diagram of a device one for a mobile terminal to exchange user information provided in the embodiment of the present document.

FIG. 2 shows a schematic diagram of a device one for a mobile terminal to exchange user information provided in the embodiment of the present document, as shown in FIG. 2, the device one comprises: a mobile terminal searching module 201, configured to obtain a wifi hotspot shared name of a first mobile terminal by wifi searching; a mobile terminal resolving module 202, configured to obtain the user information of the first mobile terminal by resolving the wifi hotspot shared name of the first mobile terminal; a mobile terminal storing module 203, configured to save the user information of the first mobile terminal.

Wherein, the mobile terminal resolving module 202 comprises: a judging unit, configured to judge whether the resolved wifi hotspot shared name is a wifi hotspot shared name conforming to a preset canonical format by resolving the wifi hotspot shared name of the first mobile terminal; an obtaining unit, configured to, when the resolved wifi hotspot shared name is the wifi hotspot shared name conforming to the preset canonical format, obtain the user information of the first mobile terminal from the wifi hotspot shared name.

Wherein the mobile terminal storing module 203 comprises: a comparing unit, configured to compare the obtained user information of the first mobile terminal with all user information in the second mobile terminal by the second mobile terminal; a storing unit, configured to, when there is no user information of the first mobile terminal in the user information of the second mobile terminal, save the user information of the first mobile terminal into the user information of the second mobile terminal, or when there is a user name of the user information of the first mobile terminal in the user information of the second mobile terminal, compare whether the mobile terminal number of the user information exists, if it does not exist, save the mobile terminal number of the user information of the first mobile terminal into the user information of the second user information, or remind the user to add the user information of the first mobile terminal again and save it.

Moreover, the embodiment of the present document further provides a mobile terminal including the above-mentioned device for a mobile terminal to exchange user information.

Figure 3:
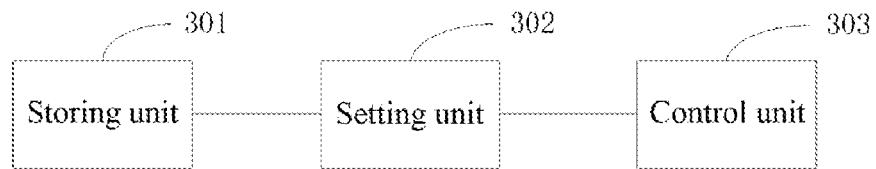
FIG. 3 is a schematic diagram of a device two for a mobile terminal to exchange user information provided in the embodiment of the present document.

FIG. 3 shows a schematic diagram of a device two for a mobile terminal to exchange user information provided in the embodiment of the present document, as shown in FIG. 3, the device two comprises: a mobile terminal information sharing module, configured to set user information into a wifi hotspot shared name of the local mobile terminal and open a wifi hotspot shared function of the local mobile terminal by the local mobile terminal.

Wherein, the mobile terminal information sharing module comprises: a storing unit 301, configured to save a previous wifi hotspot shared name of the local mobile terminal; a setting unit 302, configured to set the user information of the local mobile terminal according to a preset canonical format into the wifi hotspot shared name of the local mobile terminal, wherein, the preset canonical format is: a special character+a user name+a special character+a mobile terminal number; a control unit 303, configured to open a wifi hotspot sharing function of the local mobile terminal.

Moreover, the embodiment of the present document further provides a mobile terminal including the above-mentioned device for a mobile terminal to exchange user information.

Figure 4:
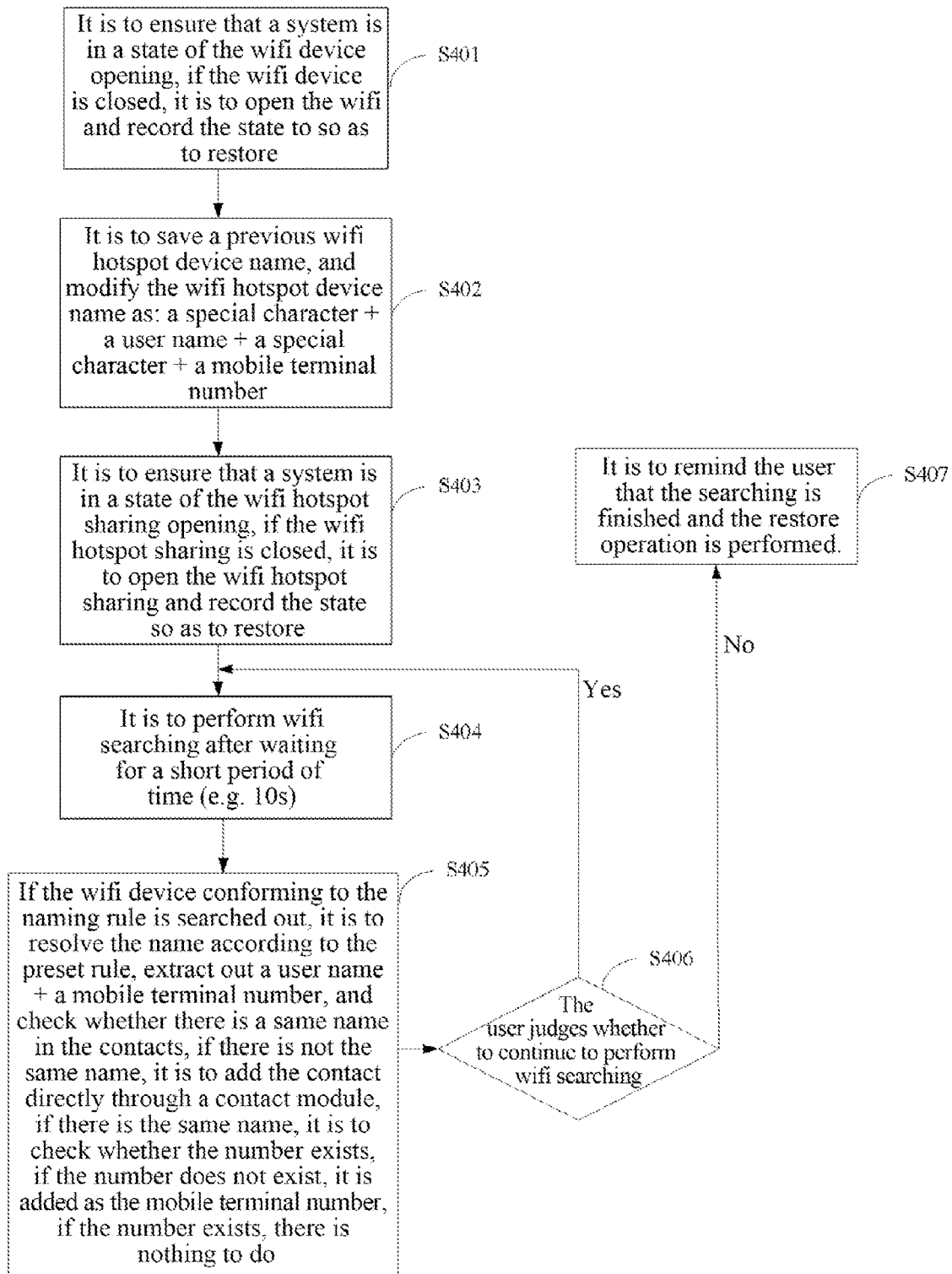
FIG. 4 is a flow chart of a mobile terminal exchanging user information provided in the embodiment of the present document.

FIG. 4 shows a flow chart of a mobile terminal exchanging user information provided in the embodiment of the present document, as shown in FIG. 4, which comprises the following steps.

In step S401, it is to ensure that a system is in a state of the wifi device opening, if the wifi device is closed, it is to open the wifi and record the state so as to restore;

In step S402, it is to save a previous wifi hotspot shared name, and modify the wifi hotspot shared name as: a special character+a user name+a special character+a mobile terminal number;

In step S403, it is to ensure that a system is in a state of the wifi hotspot sharing opening, if the wifi hotspot sharing is closed, it is to open and record the state so as to restore;

In step S404, it is to perform wifi searching after waiting for a short period of time (e.g. 10s);

In step S405, if the wifi device conforming to the naming rule is searched out, it is to resolve the name according to the preset rule, extract a user name+a mobile terminal number, and check whether there is a same name in the contacts, if there is not the same name, it is to add the contact directly through a contact module, if there is the same name, it is to check whether the number exists, if the number does not exist, it is added as the mobile terminal number, if the number exists, there is nothing to do.

In step S406, the user judges whether to continue to perform wifi searching;

if yes, it is to continue to repeat the step S404, otherwise, it is to perform the next step.

In step S407, it is to remind the user that the searching is finished and the restore operation is performed.

The restore operation comprises: restoring the wifi hotspot name, closing wifi hotspot sharing (if necessary), closing the wifi (if necessary).

In the embodiment of the present document, when the user terminal needs to change business cards, the program automatically sets the wifi hotspot shared name of itself as "a special character+a user name+a special character+a mobile terminal number" and opens the wifi hotspot sharing on the mobile terminal. The searching flow is started after waiting for a short period of time. After the wifi device conforming to naming rule is searched out, it is to resolve out the user name and the mobile terminal to be added as the user. In the whole process, it is no need to connect with the wifi veritably, only simple wifi searching is needed. Moreover, after this function is closed, the wifi can be restored to the state before opening.

In conclusion, in the embodiments of the present document, add the name and contact information for each other are added into their own cellphones according to a wifi hotspot shared name by opening the wifi hotspot, which greatly facilitate adding contacts for the people, and saves the time.

Although the present document is illustrated in detail in the above, the present document is not limited thereto; those skilled in the art may make various modifications according to the principles of the present document. Therefore, all the modifications made in accordance with the principle of the present document should be understood to fall into the protection scope of the present document.

INDUSTRIAL APPLICABILITY

In the embodiments of the present document, the operation of adding contact information is performed according to the wifi hotspot name by opening the wifi hotspot, which saves the step of the user inputting information, brings convenience to the user and saves the time.

What is claimed is:

1. A method for a mobile terminal to exchange user information, comprising:
   a second mobile terminal obtaining a wireless fidelity (wifi) hotspot shared name of a first mobile terminal by wifi searching; wherein the wifi hotspot shared name of the first mobile terminal carries user information of the first mobile terminal; and the user information comprises a user name and a phone number of the first mobile terminal;
   the second mobile terminal resolving the wifi hotspot shared name of the first mobile terminal to obtain user information of the first mobile terminal; and obtaining the user name and the phone number of the first mobile terminal;
   the second mobile terminal saving the user name and the phone number of the first mobile terminal as business card information of user of the first mobile terminal.

2. The method of claim 1, wherein the step of the second mobile terminal resolving the wifi hotspot shared name of the first mobile terminal to obtain user information of the first mobile terminal comprises:
   the second mobile terminal resolving the wifi hotspot shared name of the first mobile terminal to judge whether the resolved wifi hotspot shared name is a wifi hotspot shared name conforming to a preset canonical format;
   if the resolved wifi hotspot shared name is the wifi hotspot shared name conforming to the preset canonical format, obtaining the user information of the first mobile terminal from the wifi hotspot shared name.

3. The method according to claim 2, wherein, the step of saving the user information of the first mobile terminal comprises:
   the second mobile terminal comparing the obtained user information of the first mobile terminal with all user information in the second mobile terminal;
   if there is no user information of the first mobile terminal in the second mobile terminal, saving the user information of the first mobile terminal into user information of the second mobile terminal.

4. A method for a mobile terminal to exchange user information, comprising: the first mobile terminal used to transmit information setting user information of the first mobile terminal into a wireless fidelity (wifi) hotspot shared name of the first mobile terminal and opening a wifi hotspot sharing function of the first mobile terminal; wherein the user information of the first mobile terminal comprises a user name and a phone number of the first mobile terminal, and the user name and the phone number—of the first mobile terminal is saved as business card information of user of the first mobile terminal, by other mobile terminal when the other mobile terminal obtains the wifi hotspot shared name of a first mobile terminal by wifi searching.

5. The method of claim 4, wherein, the step of a first mobile terminal used to transmit information setting user information of the first mobile terminal into a wifi hotspot shared name of the first mobile terminal comprises:
  the first mobile terminal used to transmit information saving a previous wifi hotspot shared name of the first mobile terminal, and setting the user information according to a preset canonical format into the wifi hotspot shared name of the first mobile terminal;
  wherein, the preset canonical format is: a special character+the user name+a special character+the phone number.

6. A device for a mobile terminal to exchange user information, comprising:
  a mobile terminal searching module, configured to obtain a wireless fidelity (wifi) hotspot shared name of a first mobile terminal by wifi searching; wherein the wifi hotspot shared name of the first mobile terminal carries user information of the first mobile terminal; and the user information of the first mobile terminal comprises a user name and a phone number of the first mobile terminal;
  a mobile terminal resolving module, configured to obtain user information of the first mobile terminal by resolving the wifi hotspot shared name of the first mobile terminal; and obtain the user name and the phone number of the first mobile terminal;
  a mobile terminal storing module, configured to save the user name and the phone number of the first mobile terminal as business card information of user of the first mobile terminal.

7. The device of claim 6, wherein, the mobile terminal resolving module comprises:
  a judging unit, configured to judge whether the resolved wifi hotspot shared name is a wifi hotspot shared name conforming to a preset canonical format by resolving the wifi hotspot shared name of the first mobile terminal;
  an obtaining unit, configured to, when the resolved wifi hotspot shared name is the wifi hotspot shared name conforming to the preset canonical format, obtain the user information of the first mobile terminal from the wifi hotspot shared name.

8. The device according to claim 7, wherein, the mobile terminal storing module comprises:
  a comparing unit, configured to compare the obtained user information of the first mobile terminal with all user information in a local mobile terminal;
  a storing unit, configured to, when there is no user information of the first mobile terminal in the local mobile terminal, save the user information of the first mobile terminal into user information of the second mobile terminal.

9. A mobile terminal, comprising the device for a mobile terminal to exchange user information of claim 6.

10. A device for a mobile terminal to exchange user information, comprising:
  a storing unit, configured to store a previous wireless fidelity (wifi) hotspot shared name of a local mobile terminal;
  a setting unit, configured to set user information of the local mobile terminal according to a preset canonical format into the wifi hotspot shared name of the local mobile terminal; wherein, the preset canonical format is: a special character+a user name+a special character+a phone number; and
  a control unit, configured to open a wifi hotspot sharing function of the local mobile terminal for other mobile terminals wifi searching;
  wherein the user name and the phone number is saved as business card information of user of the first mobile terminal, by the other mobile terminal when the other mobile terminal obtains the wifi hotspot shared name of the local mobile terminal.

11. A mobile terminal comprising the device for a mobile terminal to exchange user information of claim 10.

* * * * *